United States Patent
Crawford

[11] 3,736,008
[45] May 29, 1973

[54] TUBE COUPLING

[76] Inventor: Cullen B. Crawford, 28151 Gelchrist, Euclid, Ohio 44132

[22] Filed: Feb. 16, 1971

[21] Appl. No.: 115,171

[52] U.S. Cl. ............................. 285/342, 285/382.7
[51] Int. Cl. .......................................... F16l 19/08
[58] Field of Search .................... 285/341, 342, 343, 285/382.7

[56] References Cited

UNITED STATES PATENTS

| | | |
|---|---|---|
| 2,536,745 | 1/1951 | Herold ................................. 285/341 |
| 3,069,188 | 12/1962 | Crawford ............................ 285/342 |
| 2,857,176 | 10/1958 | McTaggart et al. ............. 285/342 X |
| 3,294,426 | 12/1966 | Lyon ............................. 285/382.7 X |
| 2,335,414 | 11/1943 | Hinrichs ....................... 285/382.7 X |

FOREIGN PATENTS OR APPLICATIONS 1,238,734 4/1967 Germany ......................... 285/341
1,450,382 3/1969 Germany ....................... 285/382.7

*Primary Examiner*—Reinaldo P. Machado
*Assistant Examiner*—David H. Corbin
*Attorney*—Oberlin, Maky, Donnelly & Renner

[57] ABSTRACT

A tube coupling including a front and rear collet which are driven into biting engagement with a tube wall, the front collet being adapted to scrape the tube material to cold flow the same into abutments against which a flat portion of such collet sealingly bears, and the rear collet being adapted to cut chips or curls from the tube material to form the seal between such rear collet and the tube. An axially forwardly extending projection on the rear collet is provided with at least one cutting edge which penetrates the tube material in a true radial direction responsive to arcuate flexing of such projection caused by engagement along a portion of the front collet, such flexing and bite occurring with relatively reduced friction between the collets due to the configuration and flexure of the projection.

6 Claims, 4 Drawing Figures

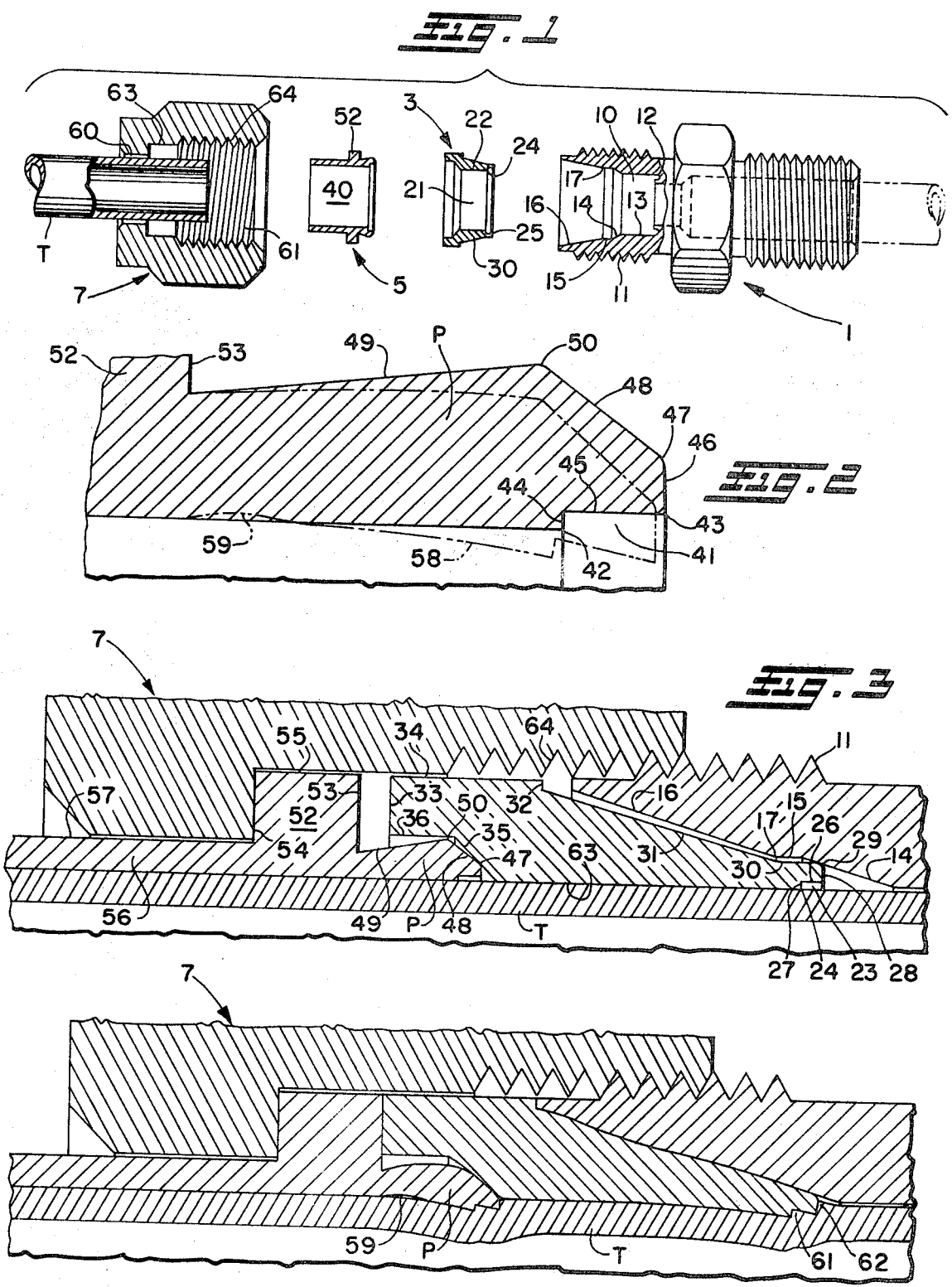

TUBE COUPLING

This invention relates as indicated to tube couplings, and, more particularly, to tube couplings having collet members deformed inwardly into sealing engagement with the tube in a manner to obtain better holding power with less torque input.

A number of different relatively deformable collet forms have been used to grip or hold tubes to be coupled by cutting or otherwise deforming the tube material. Particular reference may be had to U. S. Pat. No. 3,069,188, issued to C. B. Crawford, wherein two collets are adapted to be cammed into a tube surface to cold flow the tube material by scraping up abutments, with further camming distortion of the collets resulting in a flat surface thereof being against such abutment to resist longitudinal displacement forces. The seals developed between the collets and tube in such coupling and thus the coupling itself are operationally substantially free from failure, however, a relatively large torque is required to be applied to the coupling nut in order to obtain the necessary seals.

Accordingly, it is the primary object of the present invention to maximize the holding power of the coupling while at the same time minimizing the torque required to effectuate the seals between collets and tube.

It is an important object of the present invention to provide a rear collet which when driven against the front collet will be cammed with relatively reduced friction into the tube material to cut at least one curl in such material. Preferably, at least one of the cutting surfaces is adapted to be cammed into the tube material in such a manner as to penetrate in a true radial direction.

It is still another important object of the present invention to provide a rear collet having an axially forwardly extending projection which has cutting edges and which is adapted to flex during closure, thereby better to direct the force applied from the pressure surface of the nut to such cutting surfaces. It has been found that a relatively direct thrust is thus developed on the collet, with the force vector between the pressure surface and the cutting edges being at an angle of about 20° with respect to the longitudinal axis of the coupling.

It is still another object of the present invention to provide a tube coupling which combines a rear collet of the type described having edges which cut the tube material with a front collet having edges to scrape up material abutments and flat surfaces to bear against such abutments. It has been found that such a collet combination forms seals between the collets and the tube which provide better holding power and which are effectuated with about one-half the torque required for conventional couplings.

These and other objects of the present invention will become apparent as the following description proceeds.

To the accomplishment of the foregoing and related ends, the invention, then, comprises the features hereinafter fully described and particularly pointed out in the claims, the following description and the annexed drawing setting forth in detail a certain illustrative embodiment of the invention, this being indicative, however, of but one of the various ways in which the principle of the invention may be employed.

In the drawing:

FIG. 1 is an exploded fragmentary section of the component parts of the present invention;

FIG. 2 is a fragmentary enlargement of the front portion of the rear collet, with phantom lines indicating the operative position of the rear collet when coupled;

FIG. 3 is a vertical section of the present invention with the nut drawn up finger-tight upon the male connector portion of the coupler body; and FIG. 4 is a vertical section similar to FIG. 3 with the nut drawn up wrench-tight on the coupler body.

Referring now to the drawing and initially to FIG. 1, the five component elements of the present invention comprising coupler body 1, front collet 3, rear collet 5, nut 7 and tube T are shown in coaxial alignment prior to coupling or assembly.

Coupler body 1 has a bore 10 of varying diameter extending longitudinally therethrough and a male connector portion 11 at one end thereof. The defining wall of bore 10 at the inner end of the male connector portion 11 has an annular concave groove 12 adapted to receive the end of tube T as will be described in more detail hereinafter. The wall structure of the bore proceeding to the left in FIG. 1 from groove 12 includes a substantially cylindrical sealing surface 13, which is preferably slightly flared outwardly on the order of 1° for ease of part disassembly, and a tapered frusto-conical camming surface 14. A cylindrical sealing surface 15 and a second outwardly tapered frusto-conical surface 16, which is preferably of less taper than surface 14, complete the wall defining structure of bore 10, with surfaces 15 and 16 forming at the intersection thereof annular edge 17.

Front collet 3 has a bore 21 extending longitudinally therethrough, such bore having a cylindrical intermediate defining surface 22 of a diameter equal to or slightly greater than the outside diameter of tube T. The front or leading portion of collet body 3 has a counterbore 23 therein which is coaxial with bore 21 and defines in the collet body annular scraping edges 24, 25, cylindrical surface 26, and shoulder 27. The front annular surface of the collet forms a substantially transverse shoulder 28 with the periphery thereof being beveled as at 29 to reduce friction between parts having relative longitudinal movement and contact in assembly. The exterior of collet 3 is formed to include cylindrical portion 30, outwardly tapered frusto-conical surface 31, shoulders 32, 33 and cylindrical surface 34. The rear portion of bore 21 is defined by adjacent intersecting surfaces comprising outwardly tapered frusto-conical surface 35, which is preferably inclined at an angle of 45° from the axis of tube T, and cylindrical surface 36.

Rear collet 5 has a bore 40 extending longitudinally therethrough, which is of a diameter equal to or slightly longer than the diameter of the tube T. The front portion of the collet 5 has a counterbore 41 therein which is coaxial with bore 40 and defines within the collet body edges or lips 42, 43, transverse shoulder 44, and cylindrical sealing surface 45. The leading annular surface 46 of the collet is inclined slightly rearwardly with respect to a transverse plane, with the preferable included angle between about 5° and 7°. The peripheral edge 47 of surface 46 is rounded or beveled to reduce scraping and friction with surface 35 of front collet 3, as will be set forth in more detail hereinafter. The exterior of the rear collet at the front portion or projection thereof, as best shown in FIG. 2, includes a tapered surface 48 increasing in diameter from front to rear, which is preferably inclined at an angle of about 35° with respect to the axis of the tube, and an adjacent tapered surface 49 decreasing in diameter from front to rear, which is preferably inclined at an angle of about 15° with respect to such axis. The intersection of surfaces 48 and 49 forms edge 50 which is beveled to reduce friction and scraping encountered in assembly. It will be appreciated that bore 40, counterbore 41, leading edge 46, and tapered surfaces 48 and 49 define an axially forwardly extending projection P which functionally cooperates with camming surface 35 of the front collet during the coupling process, as will be set forth in more detail hereinafter.

The rear portion of collet 5 includes pressure flange 52, which externally comprises front shoulder 53, rear shoulder 54 and cylindrical surface 55, and an elongated tubular sleeve 56.

Nut 7 includes coaxially aligned bore 60 and counterbore 61, which define within such nut cylindrical surface 63 and blind end pressure surface 62. Cylindrical surface 63 has female threads 64 formed along the front portion thereof, which threads cooperate with the male connector threads on coupler body 1.

In assembly, tube T is drawn axially through the aligned bores of the component elements until the end of the same is in engagement with annular concave seating groove 12, and the nut 7 is then drawn up finger-tight on male connector 11 to the position shown in FIG. 3. In such position, blind end pressure surface 62 abuts the rear shoulder 54 of pressure flange 52; beveled edge 47 on rear collet 5 abuts frusto-conical camming surface 35 of front collet 3; and beveled edge 29 of front collet 3 is in engagement with frusto-conical camming surface 14 of coupler body 1.

The relative movement and camming actions between the parts upon wrench tightening nut 7 will be described in a sequence beginning with the rear collet movement against the front collet and then proceed forwardly within such coupling, although it will be appreciated that the defined sequence of collet deformation is for purposes of clarity only and such deformation might in fact occur simultaneously or in reverse order. As pressure surface 62 of nut 7 moves forwardly, beveled edge 47 will shuttle downwardly along camming surface 35, which downward movement will begin slightly to arcuately flex the forwardly extending projection P to bring tapered surface 48 into an abutting camming relationship with surface 35. Such initial flexure movement of the projection P will move cutting edge 43 toward the tube material and cutting edge 47 into such material, thereby to begin removal of the first chip or curl. As the camming movement continues, the projection P will further arcuately flex until, at the completion of wrench tightening, edge 47, tapered surface 48, and edge 50 are all deformed against camming surface 35. In such position, cutting edges 42 and 43 have removed two curls from the tube material, and such edges and flat surfaces 44 and 46 are effectively in sealing engagement with the tube.

Back slope 49 reduces the radial thickness of the projection adjacent pressure flange 52 and enables such projection to flex more readily for example than the projection shown in the referenced Crawford patent. The extent of arcuate movement for surface 47 is interrelated with the rearward inclination of surface 46 so that such surface will penetrate the tube material in a true radial direction as shown in phantom in FIG. 2.

The degree of flexure in the projection P is additionally predetermined so that upon coupling the radially inner surface 58 of collet 5, as shown in exaggerated form at 59, will bulge slightly radially outwardly away from tube T, such bulge helping to create a more direct force vector from pressure surface 62 to the cutting edges 42, 43.

The unique configuration of projection P which allows flexure and clearance from the front collet except at the camming surface significantly reduces the sliding friction between such projection and camming surface 35. In fact, the present coupling requires only about half the torque to effect coupling that it takes to seal conventional couplings, the reduction in torque obviously being a result of such reduced friction.

In regard to the camming movement of the front collet in response to forward movement of the pressure surface, beveled edge 29 will shuttle downwardly along camming surface 14, thereby to place edges 24, 25 into scraping engagement with the outer surface of tube T. The taper of surface 14 allows edges 24, 25 to travel a sufficient longitudinal distance along tube T to cold flow such material into two abutments 61 and 62. Camming surface 16 and edge 17 will, upon mating with surface 31, deformably force the rear radially inner surface 63 of the collet into engagement with the tube T and cause flat surfaces 27 and 28 to move to a more radial position against abutments 61 and 62, respectively. In the wrench tight position, the surfaces 27 and 28 are held against the force of the tube bulging radially outwardly, thereby to lock the same together in forming two of the major seals of the invention.

The differences in the seals formed by the rear and front collets should be readily apparent from the above discussion. Basically, the front collet cold flows the tube material into abutments which are engaged by flat surfaces thereon while the rear collet takes chips from the tube material, such chips curling backward from the edge travel. In addition, the front surface of the rear collet is designed to radially penetrate the tube material as opposed to the inclination of the flat surfaces of the front collet, and the slight separation of the radially inner surface of the rear collet does not occur in the front collet.

The combination of the two collet forms described has been found to increase tube holding power over known tube couplings, such as that previously referenced, while also reducing torque required. The resultant coupling force between pressure surface and seals is inclined at an angle of approximately 20° with respect to the longitudinal axis of the coupling.

Although the rear collet has been discussed exclusively from the standpoint of its combination with a front collet, it will be understood that such rear collet could singularly be used with a coupling body having a camming surface therein corresponding to surface 35 on front collet 3.

The embodiments of the invention in which an exclusive property or privilege is claimed are defined as follows:

1. A tube coupling comprising a body member adapted to receive and seat the end of a tube, said body member having a camming surface therein; a front collet member having a bore through which the tube extends and a camming surface therein; a rear collet member having a bore through which the tube extends, a radially extending flange on said rear collet member and a frontal projection extending from said flange, said frontal projection having an annular and rearwardly inclined leading face with a radially inner cutting edge and including, as an exterior surface, a first forwardly positioned tapered surface increasing in diameter from front to rear and a second rearwardly positioned tapered surface intersecting said first surface at its forward end, decreasing in diameter from front to rear, and intersecting said flange at its rearward end, thereby to reduce the radial thickness of said projection adjacent said radially extending flange to enable said projection more readily to flex; and a nut slidable along the tube and threadedly engaging the body member to capture said front and rear collets with said nut, when tightened, being threadedly advanced along said body member, said nut having an internal shoulder to engage said flange to drive said rear collet forwardly, which in turn drives said front collet forwardly until said internal shoulder, said radial flange, said front collet and said body are in end to end abutment precluding further nut advancement, the forward advancement of said rear collet driving said frontal projection on said rear collet against the cam surface in said front collet to cause said frontal projection to flex and drive said cutting edge into biting engagement with the tube, said annular leading face being inclined rearwardly at an angle interrelated to the slope of said cam surface in said first collet, whereby said cutting edge penetrates said tube in a direction substantially radial to the axis of the coupling, when the nut has been fully tightened.

2. A tube coupling as set forth in claim 1 wherein said leading annular surface on said frontal projection is inclined at from about 5° to about 7° rearwardly of a transverse plane through the axis of the tube at said cutting edge when said frontal projection is unflexed.

3. A tube coupling as set forth in claim 1 including a beveled edge between said leading annular surface and said first tapered surface operative to engage the camming surface in said front collet.

4. A tube coupling as set forth in claim 1 including a beveled edge between said first tapered surface and said second tapered surface.

5. A tube coupling as set forth in claim 1 wherein said first tapered surface, said second tapered surface, and said camming surface within said front collet are inclined at angles of about 35°, 15° and 45°, respectively, with respect to the axis of said coupling.

6. A tube coupling as set forth in claim 1 wherein the engagement of said internal shoulder and said flange provides a resultant force upon tightening of said nut extending at approximately a 20° angle with respect to the axis of said coupling from said shoulder to said cutting edge.

* * * * *